(12) United States Patent
Doran et al.

(10) Patent No.: US 11,477,349 B2
(45) Date of Patent: Oct. 18, 2022

(54) METHOD OF GENERATING A MAP FOR USE IN A LASER ENGRAVING PROCESS AND LASER ENGRAVING METHOD

(71) Applicants: HID Global CID SAS, Suresnes (FR); HID Global Ireland Teoranta, Baile Na HabHann (IE)

(72) Inventors: Paul Shane Doran, Galway (IE); Nipun Sharma, Colombes (FR)

(73) Assignees: HID Global CID SAS, Suresnes (FR); HID Global Ireland Teoranta, Baile Na HabHann (IE)

( * ) Notice: Subject to any disclaimer, the term of this patent is extended or adjusted under 35 U.S.C. 154(b) by 0 days.

(21) Appl. No.: 17/452,307

(22) Filed: Oct. 26, 2021

(65) Prior Publication Data

US 2022/0166902 A1    May 26, 2022

(30) Foreign Application Priority Data

Nov. 20, 2020    (EP) .................................... 20315464

(51) Int. Cl.
H04N 1/60 (2006.01)
B41M 5/24 (2006.01)
H04N 1/62 (2006.01)

(52) U.S. Cl.
CPC ............ *H04N 1/6094* (2013.01); *B41M 5/24* (2013.01); *H04N 1/6027* (2013.01); *H04N 1/62* (2013.01)

(58) Field of Classification Search
CPC ..... H04N 1/6094; H04N 1/6027; B41M 5/24; B42D 25/435
See application file for complete search history.

(56) References Cited

U.S. PATENT DOCUMENTS 8,585,956 B1 * 11/2013 Pagryzinski ............. B41M 5/24
 264/400
11,249,456 B2 * 2/2022 Shapiro ..................... G06T 7/40
(Continued)

FOREIGN PATENT DOCUMENTS

CA    2389857 C  * 10/2006  .............. B41M 1/36
EP    2256576 A1 * 12/2010  ........... B23K 26/032
(Continued)

OTHER PUBLICATIONS

"European Application Serial No. 20315464.6, Extended European Search Report dated May 21, 2021", 7 pgs.

*Primary Examiner* — Ted W Barnes
(74) *Attorney, Agent, or Firm* — Schwegman Lundberg & Woessner, P.A.

(57) ABSTRACT

A laser engraving apparatus (100) is calibrated using a number of predetermined calibration images (12). The calibration images (12) are engraved on a predefined substrate surface (14, 15) of a substrate (16) by varying only a single laser parameter. Based on measured colour values of the engraved calibration images, a relationship between said colour values and a predefined laser parameter value, for example, a predefined laser power, is established. This relationship is then used to generate a map for mapping a grayscale value of an input image to a grayscale value of an output image, which is then engraved on the substrate (16) while varying the same laser parameter that was varied during the calibration.

16 Claims, 5 Drawing Sheets

(56) References Cited

U.S. PATENT DOCUMENTS

2012/0074107 A1* 3/2012 Berthe ................ B23K 26/032
                                                      219/121.68
2018/0049497 A1* 2/2018 Benefiel .................. A41H 3/08
2018/0147658 A1* 5/2018 Shapiro ............... B23K 26/364
2018/0150058 A1   5/2018 Shapiro
2020/0103681 A1* 4/2020 Jung .................... B23K 26/066

FOREIGN PATENT DOCUMENTS

| EP | 2256576 A1 | | 12/2010 | |
| JP | 2004114638 A | * | 4/2004 | |
| JP | 3551988 B2 | * | 8/2004 | |
| JP | 3717308 B2 | * | 11/2005 | |
| JP | 3905177 B2 | * | 4/2007 | ................ B41J 2/36 |

* cited by examiner

| | | | |
|---|---|---|---|
| 0 | 0 | 255 | |
| 1 | 2 | 253 | |
| ⋮ | ⋮ | ⋮ | |
| 40 | 45 | 212 | |
| ⋮ | ⋮ | ⋮ | |
| 210 | 212 | 45 | |
| ⋮ | ⋮ | ⋮ | |
| 255 | 255 | 0 | |

METHOD OF GENERATING A MAP FOR USE IN A LASER ENGRAVING PROCESS AND LASER ENGRAVING METHOD

CROSS-REFERENCE TO RELATED APPLICATION(S)

This application claims the benefit of priority to EP Patent Application No. 20315464.6, titled "Method of Generating a Map for Use in a Laser Engraving Process and Laser Engraving Method," filed Nov. 20, 2020, which is hereby incorporated by reference herein in its entirety.

TECHNICAL FIELD

The present disclosure generally relates to laser engraving techniques in the field of identification documents, in particular, to a calibration method of generating a map for use in a laser engraving process, and a subsequent laser engraving method using such a map.

BACKGROUND

Generally, in the market of physical identification documents, a laser engraved image is considered vital, as the image features are obtained inside the polycarbonate substrate rather than on the surface of the substrate. A laser engraved feature on a surface of a polycarbonate substrate may include a black and white (in particular, grayscale) image, a colour image or special features like the Mirage technology of the present applicant.

Therefore, it is important to engrave, for example, a portrait image with 256 levels of grayscale as an image which is neither too dark nor too light in terms of contrast, in other words, is of good quality even for extreme facial contrasts. This makes it important for any laser engraving method to allow engraving of portraits with different facial contrast with a single laser parameter in such a way that the portraits having extreme facial contrast are visible with a good quality and without any issues.

US 2012/0074107 A1 discloses a system for the calibration of at least one parameter of a laser engraver. An engraving device is arranged in such a way that the engraving device works to engrave a substrate with a specific engraved layout corresponding to a variation of at least one parameter. A vision system is connected to a comparison device of at least one measured engrave parameter with a template value of at least one stored data in a memorization device connected to an engraving correction device.

The present disclosure is directed, at least in part, to improving or overcoming one or more aspects of prior systems, without being limited to a single laser engraver.

SUMMARY OF THE DISCLOSURE

According to one aspect of the present disclosure, a method of generating a map for use in a laser engraving process using a laser engraving apparatus comprises providing a plurality of calibration images having mutually different, uniform grayscale values between a minimum grayscale value and a maximum grayscale value. The method further comprises engraving the plurality of calibration images on a predefined substrate surface of a substrate by varying only a single (selected) laser parameter of the laser engraving apparatus (for example, laser scan speed, laser scan power or black and white powers, repetition rate, etc.). A colour value of each of the engraved calibration images and of the predefined substrate surface in a colour space is measured. A plurality of colour space distances between each of the colour values of the engraved calibration images and the colour value of the substrate surface is calculated. Each of the colour space distances is associated with one of a plurality of predefined laser parameter values between a minimum laser parameter value and a maximum laser parameter value in accordance with the grayscale values and/or the colour distances of the corresponding calibration images. Based on the association, a relationship between the colour space distance and the laser parameter value is determined. A map for mapping a grayscale value of an input image to a grayscale value of an output image is generated by determining a colour space distance for a grayscale value of an input image, determining a corresponding laser parameter value based on the determined relationship, determining a grayscale value of an output image based on a predefined relationship between the determined laser parameter value and the grayscale value of the output image, and mapping the grayscale value of the input image to the grayscale value of the output image.

In another aspect of the present disclosure, a method of engraving an image on a substrate using a laser engraving apparatus comprises receiving an input image. If the input image is not a grayscale image, the method further comprises converting the input image into a grayscale image. A grayscale value of each pixel of the grayscale image is mapped onto a new grayscale value using a map generated for the laser engraving apparatus and the substrate using the method of the above aspect to generate a new grayscale image. The new grayscale image is engraved on the predefined substrate surface of the substrate by varying the laser parameter varied during the generation of the map.

Other features and aspects of the present disclosure will be apparent from the following description and the accompanying drawings.

DETAILED DESCRIPTION

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that it is desirable to calibrate a laser engraving apparatus in such a manner that the grayscale values used for engraving different contrast images by varying a single laser parameter should be averaged over the engraving range. Herein, the term "grayscale image" is understood as any image in which pixel values have values between a minimum lightness value (e.g., 0) and a maximum lightness value (e.g., 255). As such, the term "grayscale image" is not limited to black and white images in which each pixel has a lightness (sometimes also referred to as "contrast" herein) between 0 (black) and 255 (white). In this manner, by varying the same laser parameter, for example, the laser power, extreme contrast images can be engraved with sufficient contrast, colour and brightness, depending on the application. This is especially useful in the security domain, i.e., for secure identification documents, for example, for a given region or country inhabited by people of different origin and race.

In particular, the present disclosure is based on the realization that the above can be achieved by carrying out three main steps, including a calibration of the laser engraving apparatus in a first step, by engraving a set of calibration images on a substrate surface, such as the surface of a polycarbonate substrate or a PVC (polyvinyl chloride) substrate. After this engraving is achieved using appropriate parameters of the laser engraving apparatus, in the second step, the colour values of the engraved calibration images are calculated. Based on the calculated colour values, a map can be generated, which can be used in the third step for image processing of an input image to be engraved on a substrate in order to achieve the above-described effect.

Figure 1:
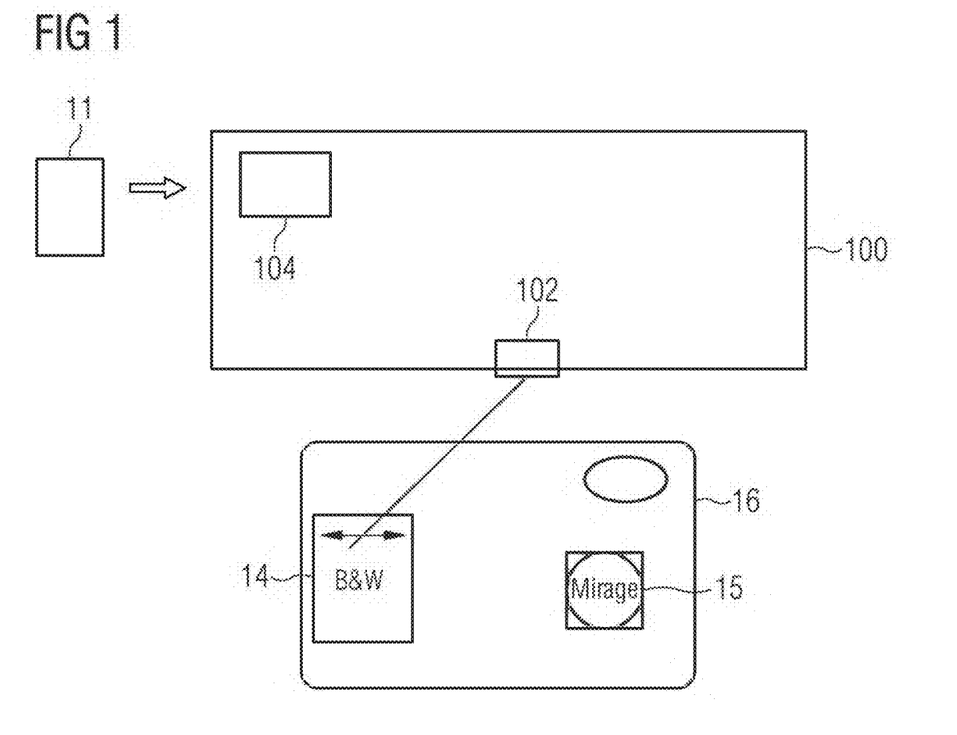
FIG. 1 is a schematic overview of a laser engraving apparatus for engraving an image on a substrate.

FIG. 1 shows a schematic overview of a laser engraving apparatus 100 for engraving an image 11 on a substrate 16. As shown in FIG. 1, laser engraving apparatus 100 includes, among others, a laser unit 102 and a control unit 104. Such a laser engraving apparatus is well-known to the skilled person, such that a detailed description of the same will be omitted. However, it will be readily appreciated that laser engraving apparatus 100 is adapted to receive image 11 to be engraved on substrate 16, and engrave image 11 on a predefined substrate surface 14 or 15 of substrate 16 by varying one or more laser parameters. For example, the laser parameters may be a laser power, a laser scan speed, a laser scan line distance, and a laser repetition rate.

Substrate 16 may be any appropriate substrate on which an image can be engraved using laser engraving techniques, for example, a polycarbonate substrate or a PVC (polyvinyl chloride) substrate which is typically used for identification documents such as an exemplary driver's license as shown in FIG. 1. Here, it will be appreciated that substrate 16 may include more than a single predefined substrate surface, such as the two different predefined substrate surfaces 14, 15 shown in FIG. 1. For example, substrate surface 14 may be a blank (for example, white) surface of substrate 16 to be engraved, and substrate surface 15 may be a special kind of substrate surface, such as a Mirage surface, which may be a substantially uniform blue surface, or any kind of surface used for engraving of facial features.

In case of substrate surface 14, it will be readily appreciated that a grayscale image can be engraved on the same by varying one or more laser parameters. In this case, image 11 may already be a grayscale image, or may be a colour image which is converted into a grayscale image by laser engraving apparatus 100. Each pixel in the grayscale image to be engraved may have a grayscale value between 0 and 255, and ideally each pixel in the engraved image would have the same greyscale value between 0 and 255. However, generally, due to the nature of a specific laser engraving apparatus 100, and also depending on the properties of the substrate 16 used, the grayscale values of the pixels in the image to be engraved are not always ideally represented in the engraved image. The same applies for the case of printing a Mirage image on substrate surface 15. In such a Mirage image, each pixel in the engraved image has a different colour value, depending on the grayscale value of the pixel of the image to be engraved. In this case, a colour value of blue corresponds to the white in the grayscale image to be engraved, and a colour value of golden corresponds to the black in the grayscale image to be engraved. It will be appreciated, however, that the Mirage example is only one example for images and colour ranges that can be engraved using the teachings of the present disclosure, while the disclosure can be used for any other security feature concerning, for example, facial engraving.

The step of calibrating laser engraving apparatus 100 will be described in more detail below. In order to perform the calibration, generally, a plurality of substrates such as substrate 16 shown in FIG. 1 will be needed. For example, a minimum of 100 blank substrates 16 may be required.

Figure 2:
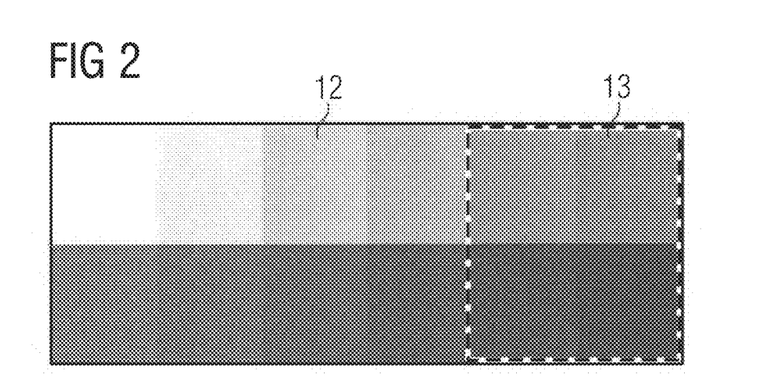
FIG. 2 is an exemplary illustration of a plurality of calibration images.

Based on the application, i.e. depending on the type of image to be engraved (for example, a black and white image or a Mirage image), a plurality of calibration images 12 having mutually different, uniform grayscale values between a maximum grayscale value and a minimum grayscale value are provided. This is shown in FIG. 2. Again, it will be appreciated that the grayscale values of the plurality of calibration images may be different for different types of images to be engraved, for example, black and white and Mirage. In any case, it is evident from FIG. 2 that the different grayscale values should cover the entire grayscale range, preferably with grayscale values that are equally distributed over the entire range. In the example shown in FIG. 2, a total of sixteen different calibration images are provided.

In a first step, it may be advantageous to select the calibration images having the darkest contrast (the minimum lightness value), and engrave the same on substrate 16. Based on whether the engraved calibration images are of sufficient quality, or whether, for example, the surface of substrate 16 is damaged (for example, burned and/or otherwise structurally altered), a user should adjust one or more laser parameters of laser engraving apparatus 100 until the image having the darkest contrast can be printed. Ideally, the same procedure should also be performed for the calibration image having the lightest contrast (the maximum lightness value). For example, the calibration image having the lightest contrast value should be indistinguishable or barely distinguishable from the substrate surface. In this manner, a range of a laser parameter, which allows for engraving all the different calibration images 12, can be determined. For example, the laser parameter may be the laser power for a constant laser repetition rate and scan speed.

Next, the user engraves all the different calibration images on the predefined substrate surface 14 or 15 of different substrates 16 while varying the single laser parameter, for example, the laser power. Here, all the other laser parameters must be constant. For the sake of efficiency, it is also conceivable that a data set 13 including several calibration images, as shown in FIG. 2, can be engraved on a single substrate 16. As will be readily appreciated, this depends on the size of the predefined substrate surface, and the device that is used for measuring the colour value of each calibration image.

Figure 3:
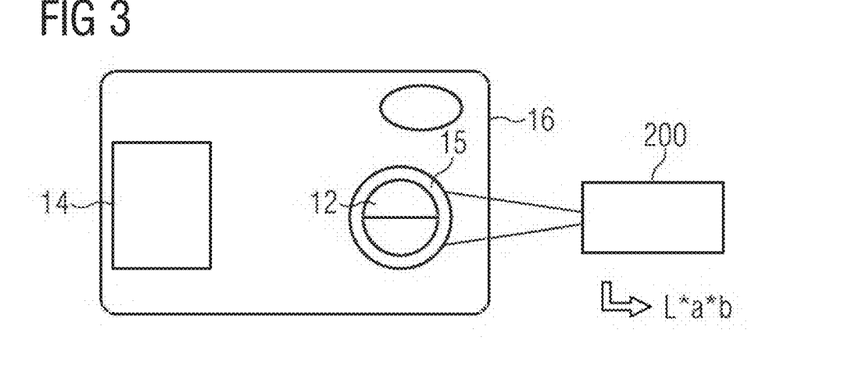
FIG. 3 is a schematic illustration showing the measurement of a colour value of an engraved calibration image.

In a next step, a colour value of each of the engraved calibration images and of the predefined substrate surface in a colour space is measured. For example, as shown in FIG. 3, a spectrometer 200 can be used to measure the colour value of the engraved calibration image. The use of such spectrometers to measure a colour value is well-known to the skilled person, such that a detailed description will be omitted. In a preferred embodiment, the colour space used in the CIELAB colour space, and the colour values are measured using a CIELAB spectrometer 200. The CIELAB colour space is also well-known to the skilled person, such that a detailed description will be omitted. However, it will be immediately obvious that, in case of an engraved black and white (grayscale) image, L* essentially describes the lightness, which corresponds to the grayscale value of the engraved image, and a* and b* should substantially be zero, as no colour is present. From this, it will also be evident that, depending on the application, any appropriate colour space can be used. For example, in case of a black and white grayscale image, a one-dimensional colour space including the lightness value only could be sufficient.

Figure 4:
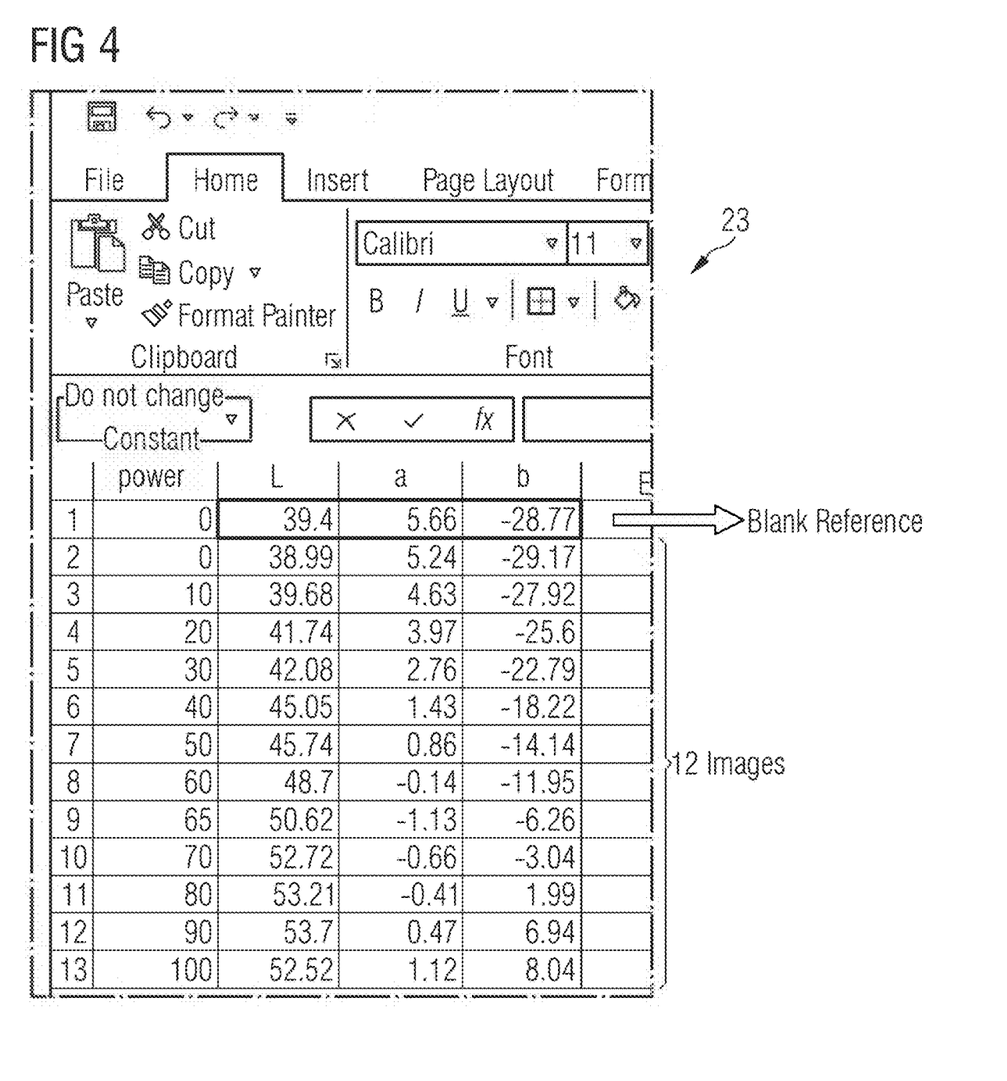
FIG. 4 is an exemplary table showing a relationship between predefined laser parameter values and measured colour values.

After all the different colour values have been measured using spectrometer 200, the determined colour values can be entered into a predefined table 23. For example, said predefined table includes, in a first column, a sequence of predefined (theoretical) laser parameter values between a minimum laser parameter value (for example, 0) and a maximum laser parameter value (for example, 100). The user now associates the measured colour values of the different calibration images with the respective predefined laser parameter values. Again, it should be pointed out that the laser parameter values in table 23 are not the actual laser parameter values that were used in order to engrave the corresponding calibration image 12, but are predefined laser parameter values essentially subdividing the entire range of the laser parameter (for example, laser power) into appropriate intervals. The first line includes the colour value of the blank reference, i.e., the blank predefined substrate surface. The next line includes the colour value of the calibration image having the lightest contrast, the last line includes the colour value of the calibration image having the darkest contrast. Here, it has been found that it may be advantageous to provide more calibration images than predefined laser parameter values. In this manner, the best calibration images can be selected by a user to complete the table shown in FIG. 4. It will be appreciated that the exemplary table in FIG. 4 is for the case of Mirage images, as can be seen from the non-zero values of a* and b*.

Once table 23 has been completed, in a next step, a plurality of colour space distances between each of the colour values of the engraved calibration images and the colour value of the substrate surface are calculated. This may be done using the formula $$\Delta E = sqrt((L^* - L^*_{ref})^2 + (a^* - a^*_{ref})^2 + (b^* - b^*_{ref})^2),$$

wherein L*, a*, b* are the colour values of the engraved calibration image, and $L_{ref}^*$, $a_{ref}^*$, $b_{ref}^*$ are the colour values of the substrate surface 14 or 15. In this manner, the effect of the substrate surface can be taken into account when calibrating laser engraving apparatus 100. As previously mentioned, either when completing table 23, or after calculating all the colour distances, a selection of a subset of the engraved calibration images can be performed, and only the colour distances of the selected subset can be associated with the predefined laser parameter values.

Figure 5:
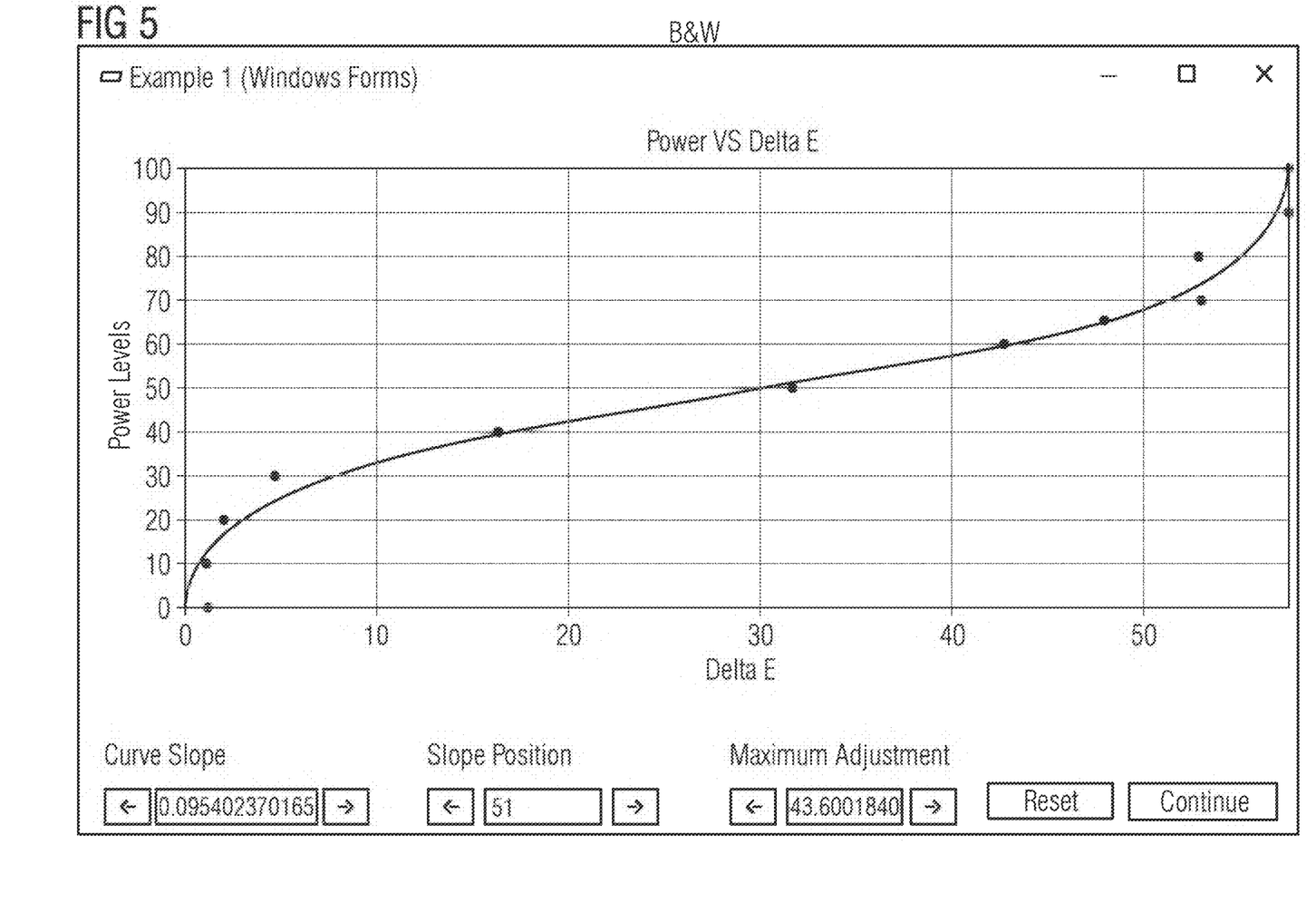
FIG. 5 is a diagram showing an example of a determined relationship between a colour space distance and a laser parameter value.

In a next step, the data points obtained by associating each of the colour space distances with one of the plurality of predefined laser parameter values are used to determine a relationship between the colour space distance and the laser parameter value for the specific laser engraving apparatus 100 and the specific substrate 16. To this end, the data points may be plotted, as shown in FIG. 5, and a curve describing the relationship between the colour space distance and the theoretical laser parameter value can be determined. For example, a theoretical curve could be fitted to the data points using known fitting algorithms. In another preferred embodiment, a user adjusts parameters of a theoretical curve describing the relationship until the theoretical curve matches the data points. This is shown in FIG. 5. For example, the user may adjust a slope of the curve, a position of the slope in the vertical direction, and/or a horizontal and/or vertical offset of the curve.

Figure 6:
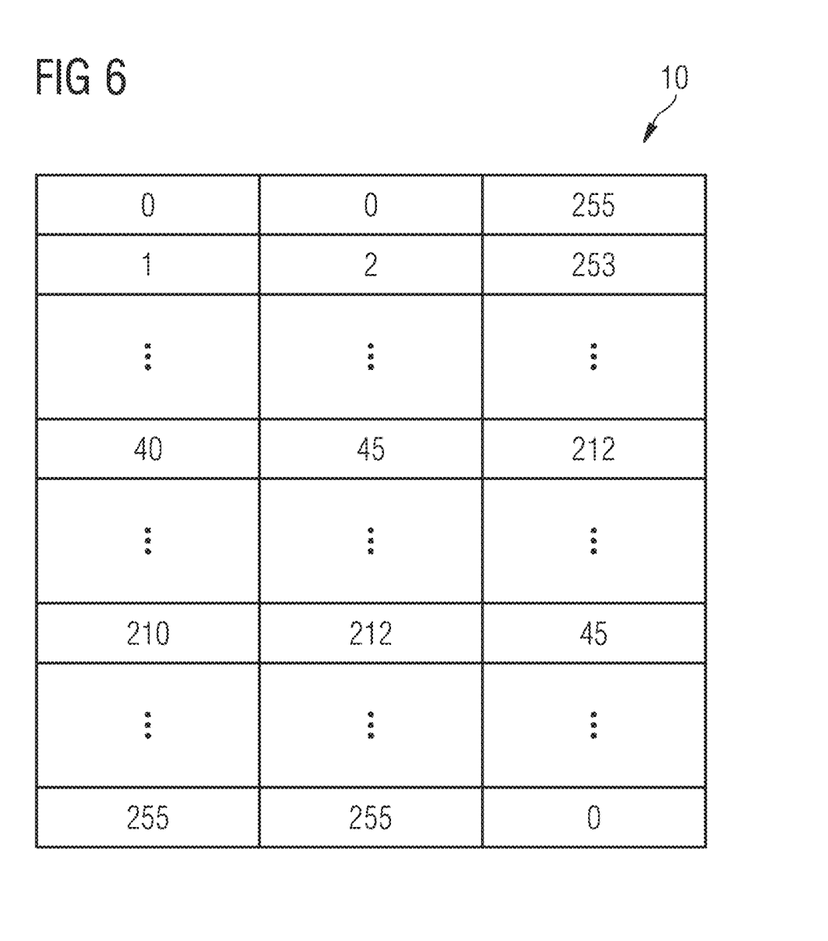
FIG. 6 shows two examples of maps generated in accordance with the present disclosure.

After this relationship has been obtained, it is then possible to generate a map mapping a grayscale value of an input image to a grayscale value of an output image based on said relationship. For example, each grayscale value between the minimum grayscale value of zero and the maximum grayscale value of 255 may be used to calculate the corresponding colour space distance. Using the obtained relationship, as will be readily apparent from FIG. 5, a corresponding laser parameter value can be obtained for each grayscale value. Then, using a predefined (known or ideal) relationship between the laser parameter value and the grayscale value of the image to be engraved, for example, a linear relationship, a new grayscale value for the output image can be determined. In this manner, as shown in FIG. 6, a map 10 mapping each grayscale value (for example, between 0 and 255) of an input image to another grayscale value (for example, also between 0 and 255) of an output image can be determined. Here, the second column in FIG. 6 shows the case for a black and white image. In other words, map 10 includes the first and the second column in FIG. 6. In the case of the Mirage example, it will be appreciated that an inverse image will be generated. Accordingly, map 10 in this case includes the first and the third column in FIG. 6.

It should also be appreciated that, in some applications, a laser parameter threshold lower than the maximum laser parameter value corresponding to a predetermined colour distance threshold may be determined, and only data points below the laser parameter threshold will be used in determining the above relationship. This is especially advantageous in the case of the Mirage example. For example, in FIG. 4, only data points up to the minimum (absolute) value of b* may be used. Accordingly, the maximum laser power used may be 80.

The generated map 10 may then be stored, for example, in a memory of control unit 104 of laser engraving apparatus 100 (see FIG. 1), or any other memory which can be accessed by laser engraving apparatus 100.

During use of laser engraving apparatus 100 to engrave an image on a substrate 16, in a first step, laser engraving apparatus 100 receives input image 11, and if input image 11 is not a grayscale image, converts the same into a grayscale image. Next, a grayscale value of each pixel of the grayscale image is mapped onto a new grayscale value using the map 10 generated for laser engraving apparatus 100 and substrate 16 using the above-described method. In this manner, a new grayscale image is generated. The new grayscale image is then engraved in the predefined substrate surface of substrate 16 by using and varying the same laser parameter that was varied during generation of the map. For example, only the laser power is varied during the engraving, while the remaining laser parameters are constant. It should be noted that, while the laser power used at the time of generating the map should be similar to the laser power used for the engraving, minor adjustments can be made, and minor deviations may be tolerated (for example, ±5%).

In this manner, as will also be evident from the shape of the curve in FIG. 5, especially image features having very dark or very light contrast can be better distinguished, by averaging the grayscale values of the entire grayscale range (i.e., making the curve more steep in the extreme contrast ranges, and flattening the curve in the intermediate contrast range).

It will be appreciated that it is also possible to generate a plurality of maps for the same laser engraving apparatus 100, but for different substrates 16 and/or different substrate surfaces 14, 15. For example, different sets of calibration images 12 could be provided for the black and white images to be engraved in predefined substrate surface 14 and the Mirage images to be engraved in predefined substrate surface 15. Both image sets could be engraved while varying the same laser parameter, for example, laser power. Then, using the above-described method, two maps can be generated, which may then be selectively used depending on whether an image is to be engraved onto substrate surface 14 or substrate surface 15. Alternatively or additionally, in case of different materials used for substrate 16, or in case of different laser engraving apparatuses, different maps can also be created for each of the black and white images to be engraved and/or the Mirage images to be engraved. In other words, these maps may be specific for a specific laser engraving apparatus, a specific material, and/or a specific substrate.

INDUSTRIAL APPLICABILITY

With the above-described methods, it can be assured that images having extreme contrast can be engraved on a given substrate by an appropriate calibration of the laser engraving parameters used to engrave the images.

Figure 7:
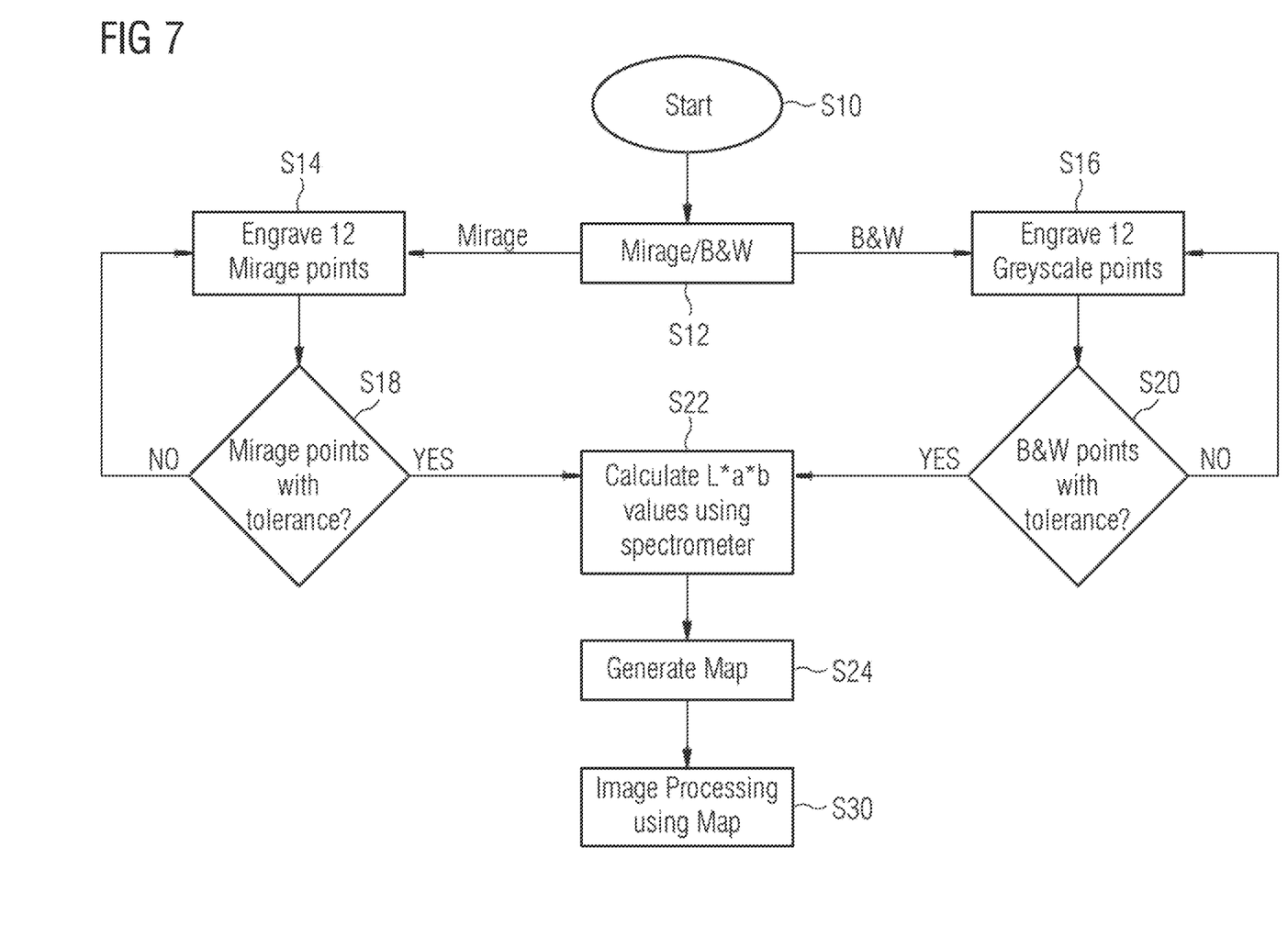
FIG. 7 shows a flow diagram of an exemplary method for generating a map in accordance with the present disclosure.

FIG. 7 shows an exemplary flow diagram describing the methods of the present disclosure. After a start in S10, a selection is made whether a calibration should be performed for a black and white image or a different image type, for example, a Mirage image in S12. Of course, the Mirage image is only exemplary, and any kind of image related to a security feature at present or in the future, for example, in the context of colour engraving on security documents using a laser, can be used. In case a black and white image should be engraved, the corresponding set of calibration images, for example, as shown in FIG. 2, is provided. A user then engraves each of the different calibration images in the set on the appropriate substrate surface in S16. In S20, it is verified that a desired number of distinguishable images of satisfactory quality have been obtained. In case of NO in S20, the engraving of the calibration images is repeated while varying one or more laser parameters. In case of YES in S20, the colour values, for example, L*a*b* values, are calculated using a spectrometer in S22.

Based on the calculated colour values, the map 10 is generated in S24 as described above.

Subsequently, when an input image 11 is to be engraved on a substrate, an appropriate image processing using the map generated in S24 is performed on the image before engraving the same using the laser engraving apparatus and the substrate for which the calibration was performed, while varying the same laser parameter that was varied during the calibration.

The processing in case of an image that is different from a black and white image is essentially similar to the processing in case of a black and white image, such that the corresponding steps S14, S18 for the Mirage example will not be described in further detail.

It is expected that, after successful calibration has been performed, the generated map should be usable for a particular laser engraving apparatus for several years. However, it should be appreciated that, even if the map generated with the method disclosed therein is used during engraving of images, for example, portrait images, on identification documents, in case the results are not 100% satisfactory, minor adjustments of one or more laser parameters may be performed in order to further increase the quality. In this manner, it can also be attempted to compensate any deviations which occur over time in the laser engraving apparatus.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. A method of generating a map for use in a laser engraving process using a laser engraving apparatus, the method comprising:
providing a plurality of calibration images having mutually different, uniform grayscale values between a minimum grayscale value and a maximum grayscale value;
engraving the plurality of calibration images on a predefined substrate surface of a substrate by varying only a single laser parameter of the laser engraving apparatus;
measuring a colour value of each of the engraved calibration images and of the predefined substrate surface in a colour space;
calculating a plurality of colour space distances between each of the colour values of the engraved calibration images and the colour value of the substrate surface;
for at least a subset of the colour space distances, associating each colour space distance with one of a plurality of predefined laser parameter values between a minimum laser parameter value and a maximum laser parameter value, in accordance with at least one of the grayscale values or the colour space distances of the corresponding calibration images;

determining a relationship between colour space distance and laser parameter value based on the associations; and generating the map by determining a colour space distance for a grayscale value of an input image, determining a corresponding laser parameter value based on the determined relationship, determining a grayscale value of an output image based on a predefined relationship between the determined laser parameter value and the grayscale value of the output image, and mapping the grayscale value of the input image to the grayscale value of the output image.

2. The method of claim 1, further comprising:

prior to engraving the plurality of calibration images, engraving at least one of the calibration image having the minimum grayscale value and the calibration image having the maximum grayscale value; and in case the substrate surface is physically damaged by engraving the calibration image having the minimum grayscale value, or in case the calibration image having the maximum grayscale value can be distinguished from the substrate surface, adjusting at least one laser parameter of the laser engraving apparatus until the substrate surface is no longer physically damaged by engraving the calibration image having the minimum grayscale value, or the calibration image having the maximum grayscale value cannot be distinguished from the substrate surface.

3. The method of claim 1, further comprising engraving two or more of the calibration images on the predefined substrate surface of a single substrate.

4. The method of claim 3, wherein the two or more calibration images are included in a single data set to be engraved.

5. The method of claim 1, wherein the single laser parameter is one of a laser power, a laser scan speed, a laser scan line distance, and a laser repetition rate.

6. The method of claim 5, wherein the colour space is a CIELAB colour space, and the colour values are measured using a CIELAB spectrometer.

7. The method of claim 6, wherein the colour space distance (ΔE) between the colour value of each engraved calibration image and the colour value of the substrate surface is calculated using the formula:

$$\Delta E = sqrt((L^* - L_{ref}^*)2 + (a^* - a_{ref}^*)2 + (b^* - b_{ref}^*)2),$$

wherein $L^*$, $a^*$, and $b^*$ are values of the engraved calibration image in the CIELAB colour space, and $L_{ref}^*$, $a_{ref}^*$, and $b_{ref}^*$ are values of the substrate surface in the CIELAB colour space.

8. The method of claim 1, further comprising selecting a subset of the engraved calibration images, to which the at least a subset of colour space distances corresponds.

9. The method of claim 1, wherein the determined relationship is determined by fitting a theoretical curve to a plurality of data points, each respectively indicating a predefined laser parameter value and its associated colour space distance.

10. The method of claim 9, wherein the fitting is performed by a user by adjusting parameters of the theoretical curve.

11. The method of claim 10, wherein the parameters of the theoretical curve include at least one of a curve slope, a slope position, a horizontal offset, or a vertical offset.

12. The method of claim 9, further comprising determining a laser parameter threshold lower than the maximum laser parameter value corresponding to a predetermined colour space distance threshold, and using only data points below the laser parameter threshold in the fitting.

13. The method of claim 1, wherein the predefined substrate surface is a predefined white background portion of the substrate, and the engraved calibration images are black and white grayscale images.

14. The method of claim 1, wherein the predefined substrate surface is a predefined coloured background portion of the substrate, and the engraved calibration images are colour images.

15. A method of engraving an image on a substrate using a laser engraving apparatus, the method comprising:
receiving an input image;
if the input image is not a grayscale image, converting the input image into a grayscale image;
mapping a grayscale value of each pixel of the grayscale image onto a new grayscale value using a map generated for the laser engraving apparatus and the substrate using the method of claim 1 to generate a new grayscale image; and
engraving the new grayscale image on the predefined substrate surface of the substrate by varying the single laser parameter varied during the generation of the map.

16. The method of claim 15, further comprising:
selecting the map from a plurality of maps generated for at least one of different substrates or different substrate surfaces.

* * * * *